US010958750B2

United States Patent
Scheinblum et al.

(10) Patent No.: US 10,958,750 B2
(45) Date of Patent: Mar. 23, 2021

(54) MAINTAINING MINIMUM INTERFACE FUNCTIONALITY IN AN ABSENCE OF A PUSH-BASED COMMUNICATIONS CONNECTION IN A GROUP-BASED COMMUNICATION SYSTEM

(71) Applicant: Slack Technologies, Inc., San Francisco, CA (US)

(72) Inventors: James Scheinblum, San Francisco, CA (US); Jason Klym, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 17/020,352

(22) Filed: Sep. 14, 2020

(65) Prior Publication Data

US 2021/0006631 A1    Jan. 7, 2021

Related U.S. Application Data

(63) Continuation of application No. 16/670,984, filed on Oct. 31, 2019, now Pat. No. 10,791,191.

(60) Provisional application No. 62/755,691, filed on Nov. 5, 2018.

(51) Int. Cl.
*H04L 29/08* (2006.01)
*H04L 12/58* (2006.01)
*H04W 4/08* (2009.01)
*H04L 29/06* (2006.01)

(52) U.S. Cl.
CPC .............. *H04L 67/26* (2013.01); *H04L 51/04* (2013.01); *H04L 67/02* (2013.01); *H04L 67/42* (2013.01); *H04W 4/08* (2013.01)

(58) Field of Classification Search
None
See application file for complete search history.

(56) References Cited

U.S. PATENT DOCUMENTS

| 2008/0182562 | A1* | 7/2008 | Bohme | H04W 24/00 455/414.2 |
|---|---|---|---|---|
| 2017/0078922 | A1* | 3/2017 | Raleigh | H04W 28/10 |
| 2018/0287982 | A1 | 10/2018 | Draeger et al. | |
| 2020/0107226 | A1* | 4/2020 | Raleigh | H04W 28/10 |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

(Continued)

*Primary Examiner* — Natisha D Cox
(74) *Attorney, Agent, or Firm* — Erise IP, P.A.

(57) ABSTRACT

Methods, systems, and apparatuses are provided for maintaining minimum interface functionality in an absence of a push based communications connection in a group-based communication system.

20 Claims, 5 Drawing Sheets

(56) References Cited

OTHER PUBLICATIONS

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 Pm) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

MAINTAINING MINIMUM INTERFACE FUNCTIONALITY IN AN ABSENCE OF A PUSH-BASED COMMUNICATIONS CONNECTION IN A GROUP-BASED COMMUNICATION SYSTEM

CROSS-REFERENCE TO RELATED APPLICATIONS

This patent application is a continuation application claiming priority benefit, with regard to all common subject matter, of U.S. patent application Ser. No. 16/670,984, filed Oct. 31, 2019, and entitled "MAINTAINING MINIMUM INTERFACE FUNCTIONALITY IN AN ABSENCE OF A PUSH-BASED COMMUNICATIONS CONNECTION IN A GROUP-BASED COMMUNICATION SYSTEM" ("the '984 Application"). The '984 Application claims priority benefit, with regard to all common subject matter, of earlier-filed U.S. Provisional Patent Application No. 62/755,691, filed Nov. 5, 2018, and entitled "MAINTAINING MINIMUM INTERFACE FUNCTIONALITY IN AN ABSENCE OF A PUSH-BASED COMMUNICATIONS CONNECTION IN A GROUP-BASED COMMUNICATION SYSTEM." The identified earlier-filed patent applications are hereby incorporated by reference in their entirety into the present application.

BACKGROUND

Systems have been provided for interactions between client devices and servers over push-based communications connections. Through applied effort, ingenuity, and innovation many deficiencies of such systems have been solved by developing solutions that are in accordance with the embodiments of the present invention, many examples of which are described in detail herein.

BRIEF SUMMARY

Various embodiments serve to provide a near real-time representation of group-based communication interface objects at a client device despite an interruption in a real-time messaging communication connection (e.g., an active websocket connection) to a group-based communication server. The various embodiments ensure a group-based communication interface maintains a minimum level of functionality or quality of service in the absence of a real-time messaging communication connection. The group-based communication server is associated with a remote computing platform (such as a group-based communication platform or other centralized data distribution computing platform). In embodiments, client devices subscribe to events associated with group-based communication interface objects such that a group-based communication server configured for real-time messaging communications transmits updated object data associated with those group-based communication interface objects to which the client device has subscribed as soon as the updated object data is available.

In addition to establishing the real-time messaging communication connection with a first group-based communication server, the client device establishes a second communication connection with a different group-based communication server (e.g., a web API) for polling to request tail data payloads. Because a duration of any interruption in the real-time messaging communication connection is unknown, it is preferable for the client device to request more updated object data from the different group-based communication server than would have normally been pushed to the client device, hence the request for the tail data payload. While the real-time messaging communication connection is maintained, tail data payloads are discarded.

However, in the event of an interruption in the real-time messaging communication connection between the client device and the group-based communication server configured for real-time messaging communications, various embodiments provide for the use of all of or a part of a tail data payload to render a subsequent group-based communication interface. The subsequent group-based communication interface may support a minimum level of functionality using the tail data payload(s), as opposed to completely losing functionality in the absence of updated object data. The minimum level of functionality (or minimum interface functionality) may include the ability to send messages (i.e., transmit messages to a group-based communication platform/system intended for display in a particular group-based communication channel interface), read group-based communication channels (i.e., receive group-based communication interfaces configured to render for display on the client device group-based communication channel interfaces), and view unread group-based communication channels (i.e., receive group-based communication interfaces configured to render for display on the client device group-based communication interfaces comprising digital representation of group-based communication channels having messages associated therewith that have not yet been accessed by the client device).

In embodiments, an apparatus for maintaining minimum interface functionality in a group-based communications system comprises at least one processor and at least one non-transitory storage device storing instructions that, when executed by the processor, cause the apparatus to receive user interaction input representative of electronic interactions with group-based communication interface objects. In embodiments, the electronic interactions with the group-based communication interface objects require updated object data for rendering a subsequent group-based communications interface. In embodiments, the electronic interactions are associated with one or more object identifiers.

In embodiments, the apparatus is further caused to establish a first communications connection with a first remote server. In embodiments, the first remote server is configured for transmitting in real-time updated object data representative of events associated with group-based communication interface objects to which the client device has subscribed. In embodiments, the updated object data is pushed from the first remote server to the client device.

In embodiments, the apparatus is further caused to establish a second communications connection with a second remote server. In embodiments, the second communications connection is a client-pull-based communications connection and configured for requesting and receiving, by the client device, tail data payloads from the second remote server.

In embodiments, the apparatus is further caused to transmit a polling request to the second remote server. In embodiments, the polling request comprises the one or more object identifiers. In embodiments, the polling request is representative of a request for a tail data payload for each of the one or more object identifiers.

In embodiments, the apparatus is further caused to receive, from the second remote server, the tail data payloads for each of the one or more object identifiers.

In embodiments, the apparatus is further caused to query a local data store of the client device for updated object data associated with the one or more object identifiers.

In embodiments, the apparatus is further caused to detect an interruption in the first communications connection upon determining the updated object data associated with the one or more object identifiers is not available in a local data store of the client device nor has the updated object data associated with the one or more object identifiers been received from the first remote server.

In embodiments, the apparatus is further caused to render for display the subsequent group-based communications interface using a first tail data payload subset. In embodiments, the first tail data payload subset is selected from the tail data payload based on the required updated object data associated with the electronic interactions.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
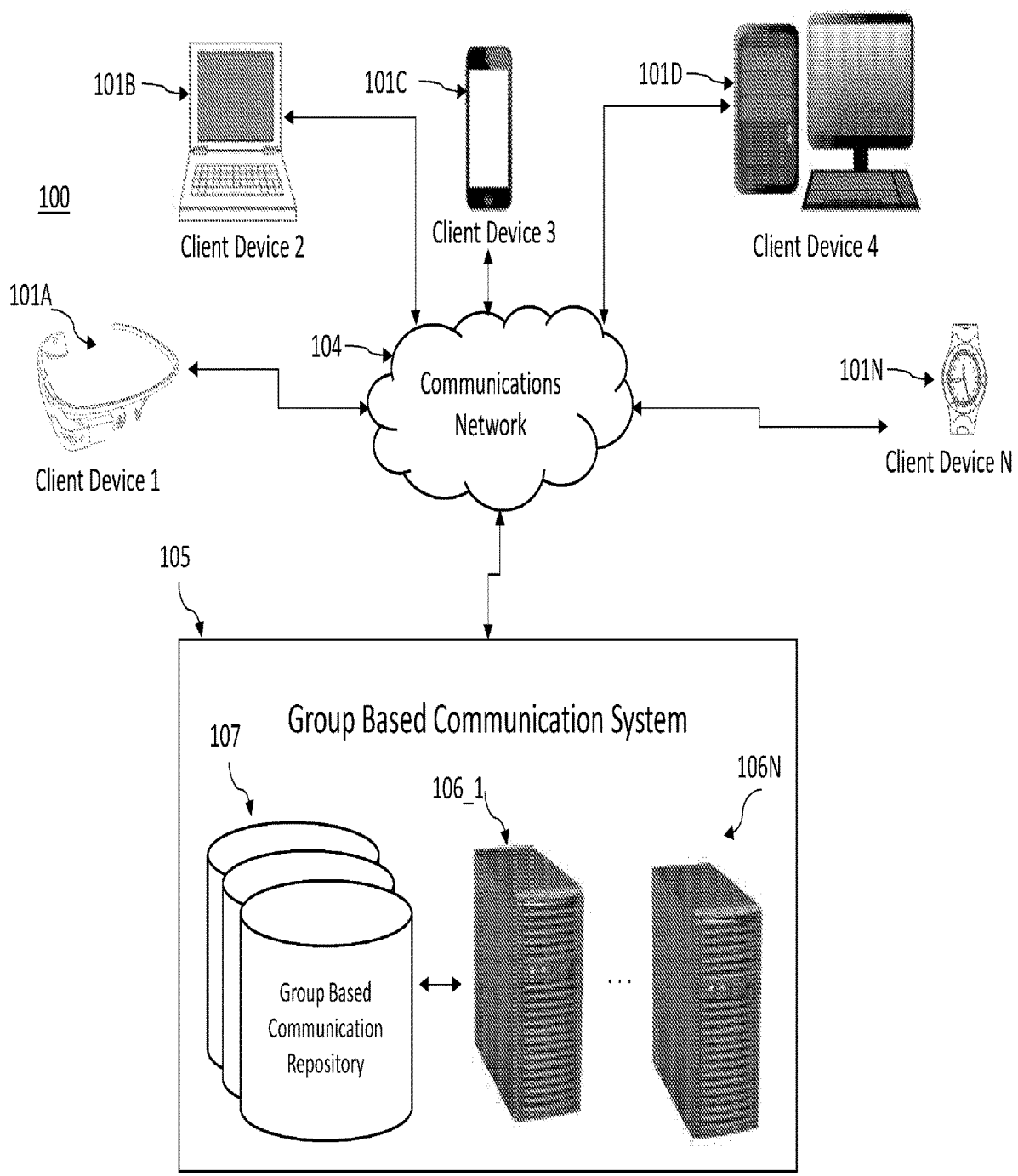
FIG. 1 shows a schematic view of a group-based communication platform in communication with client devices according to embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, client devices receive data transmissions from group-based communication servers and render group-based communication interfaces based on the received data. Objects associated with the group-based communication interfaces, and therefore the group-based communication system, may be rapidly changing, quickly rendering any object data at the client device "stale" or "out of date." Accordingly, a group-based communication system may rely upon a real-time messaging (RTM) communications connection to provide real-time updated object data to client devices based on objects for which each client device has requested updates.

In the event that real-time messaging communications connections are interrupted for any reason, object data at the client device may remain stale or out of date, and the client device may not actively interact with the group-based communication interface. Embodiments of the present disclosure provide a solution to this problem.

While polling by client devices in the group-based communication system, on a regular basis in place of a real-time messaging connection, may not provide ideal performance (i.e., latency), polling presents a reliable backup mechanism by which a client device may receive updated object data and support operations and interactions with the group-based communication interface on the client device.

The inventors have determined that a sole reliance upon a real-time messaging connection (e.g., an active websocket connection) for receipt by a client device of updated object data associated with a group-based communication system leads to a lack of up to date object data on a client device and a resulting compromise of application functionality (e.g., a group-based communication interface may not perform or function as intended), reducing efficient use of computing resources by the client device (i.e., excess stale data in cache/memory, excessive interface refreshes, improper allocation of screen real estate, and the like).

Accordingly, presented herein are embodiments directed to a near real-time representation of group-based communication interface objects at a client device despite an interruption in a real-time messaging communication connection (e.g., an active websocket connection) to a group-based communication server. Embodiments comprise a detection of an interruption in the real-time messaging communications connection upon determining the updated object data associated with one or more object identifiers is not available in a local data store of the client device nor has the updated object data associated with the one or more object identifiers been received from the first remote server. The client device has also established a second communications connection with a different group-based communications server (e.g., via a web API) and requested a tail data payload for each of the objects associated with the one or more object identifiers. Under normal operating conditions, when the client device confirms that the updated object data is available in the local data store and/or that the updated object data has been received from the first remote server, the client device discards the tail data payload.

In embodiments, upon determining that the real-time messaging communications connection is interrupted, and therefore that the updated object data has not been received over the real-time messaging communications connection, the client device uses (rather than discards) the tail data payload(s) to render a subsequent group-based communication interface. It will be appreciated that the tail data payload comprises more data than would have been received over the real-time messaging communication connection (i.e., the updated object data pushed to the client device from the first remote server).

The client device can then render a subsequent group-based communication interface based on all of or a subset of the received tail data payloads. Accordingly, the group-based communication interface may provide minimum functionality with near real-time updated object data.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, proxies, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system (e.g., a computing platform, such as a group-based communication platform), in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

To access the services of a computing platform, the client device and/or computing platform establish a network connection (e.g., a "communication connection") therebetween embodied as an individual connection session. A single client device may utilize a plurality of connection sessions with a computing platform for data transfer over a period of time. As discussed herein, data relevant to a particular client device (e.g., updates for particular objects) may continue to be generated by (or provided to) the computing platform between connection sessions (while the client device is disconnected from the computing platform), and such data may be provided to the client device during a subsequent connection session.

In embodiments, a communication connection may be an active websocket connection (e.g., an "real-time messaging" (RTM) connection, a "push" or server initiated connection), a non-RTM connection (e.g., a "pull" or client initiated connection), and the like. A client device may communicate with an RTM server (e.g., a group-based communication server configured for real time messaging communications) over an active websocket connection. A client device may, in addition or alternatively, communicate with a non-RTM server (e.g., a group-based communication server not configured for real time messaging communications) over a non-RTM connection (e.g., by utilizing an HTTP request message).

The terms "group-based communication system" and "group-based communication platform" refer to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and external application servers.

The term "group-based communication channel" refers to a virtual communications environment or feed that is configured to display group-based messages posted by channel members (e.g., validated users accessing the environment using client devices) that are viewable only to the members of the group. The format of the group-based communication channel may appear differently to different members of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel interface (i.e., group-based messages) will not vary per member of the group-based communication channel. In embodiments, however, the content of the group-based communication channel interface may vary per member of the group-based communication channel based on varying permissions associated with each member (e.g., a first member may post a message to a channel along with a file; the message may be displayed to a second member but the file may not be accessible by the second member, in which case the display of the file may differ from the display of the file to the first member).

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

In certain embodiments, the group-based communication interface may comprise multiple visible panes within a display window, for example. In certain embodiments, each display pane may be configured to display specific data types. For example, a left-most pane may provide a listing of channels and/or direct messages available to a user and a right-most (or center pane, in a 3-pane configuration) may display the content of a particular channel in which messages are exchanged, including displaying all of those displayed messages. The content of the center pane may be presented as a scrollable feed in certain embodiments. In embodiments in which the main display window comprises 3-panes, the right-most pane may comprise additional data regarding a particular selected message, channel, and/or the like.

As used herein, the terms "messaging communication" and "message" refer to any electronically generated digital content object provided by a user using a client device and that is configured for display within a group-based communication interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, an object identifier, a group identifier and/or a group-based communication channel identifier. Each of the foregoing identifiers may comprise ASCII text, a pointer, a memory address, and the like. Messages may be generated and/or edited within an individual pane of a group-based communication interface (a single pane being visible within a particular display window) and/or messages may be generated and/or edited within separate display windows (e.g., separate display windows may be utilized for generating postings to be shared within a communication channel and/or for initiating a call with other users).

The term "object" as used herein may refer to any content source for which updates may be provided and disseminated to one or more client devices. A particular user may be considered an object to other users, such that updates regarding the characteristics and/or activities of the particular user may be disseminated to other client devices. Objects may also be embodied as files in certain embodiments, such that updates to those files may be disseminated to individual client devices. Objects may also be embodied as channels in certain embodiments, such that updates to those channels may be disseminated to individual client devices. Updates relating to particular objects may be disseminated from the group-based communication platform to individual client devices as messages, which may comprise additional metadata identifying a particular object (referred to herein as an object identifier) to which the updates relate. These object identifiers enable a client device to display the update in association with the appropriate object and/or store the update in association with the appropriate object within a local data store on the client device. In certain embodiments, the object identifiers comprise data indicative of the type of object to which the object relates (e.g., a user object, a file object, and/or the like) and may additionally or alternatively comprise data indicative of a unique string (e.g., a unique number, a unique alphanumeric string, and/or the like) that uniquely identifies the object (e.g., among all of objects or among all objects of a particular object type). In embodiments, a group-based communication interface object is associated with an object such that a group-based communication interface is a rendering in a graphical user interface (GUI) of a representation of the object.

Object updates (or "updated object data") may be provided to client devices. Objects stored locally within a local data store on the client device (e.g., locally stored copies of objects reflected on the computing platform) are updated by replacing and/or supplementing data stored within the local data store of the client device with new data reflective of the object updates received from a computing platform, such as the group-based communication platform. For example, updated object data may be representative of events associated with group-based communication interface objects (e.g., channels) to which the client device has subscribed (e.g., a websocket event subscription).

The locally stored objects within the data store may be utilized by one or more applications, computer programs, or other local processing instances executing on the client device. These local processing instances may comprise one or more graphical user interfaces for displaying objects, one or more executable programs configured for intaking objects as input, and/or the like. The locally stored objects may be retrieved from the local data store via a "get" process in which the objects are retrieved from the local data store and passed to one or more local processing instances. In examples, the locally stored objects are utilized in generating, for display, a group-based communications interface on a client device.

The terms "group identifier" or "team identifier" refer to one or more items of data by which a group within a group-based communication system may be identified. For example, a group identifier may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate teams. Thus, a channel identifier may be provided together with one or more group identifiers to specifically identify where data/messages related to the particular communication channel are stored.

The term "group-based communication interface" refers to a virtual communications environment configured to facilitate user interaction with a group-based communications system. Each group-based communication interface is accessible and viewable to a selected group of users, such as a group of employees of a business or organization (e.g., the Slack Corp. interface would be accessible and viewable to the Slack employees however the ACME Corporation group-based communication interface might not be accessible and viewable to Slack employees unless the interface is designated as shared). The group-based communication interface includes a plurality of group-based communication channels (e.g., a marketing channel, sales channel, accounting channel, etc.), which are defined below.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier). A group-based communication channel may have a name associated therewith (a group-based communication channel name) that may be displayed in a group-based communication interface such that a user having a client device may interact with the interface in order to select the displayed name.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Group-based communication servers" or "remote servers" as discussed herein with reference to certain embodiments are computing devices configured for interacting with various client devices (e.g., via an interface computing entity) for receiving and/or disseminating object updates and/or other messages among client devices. Group-based communication servers may be configured to receive, generate, store (in an associated database), and/or direct messages received from and/or disseminated to users (e.g., via corresponding client devices). The functionality of the group-based communication servers may be provided via a single server or collection of servers having a common functionality, or the functionality of the group-based communication servers may be segmented among a plurality of servers or collections of servers performing subsets of the described functionality of the group-based communication servers.

The group-based communication servers or remote servers may be configured to maintain connection sessions with various client devices. Specifically, one or more servers may be configured for maintaining websocket connections (e.g., active websocket connections) initiated by each of a plurality of client devices for transmitting messages (e.g., object updates) and corresponding metadata (e.g., comprising object identifiers) in real time between group-based communication servers of the group-based communication platform and respective client devices.

The term "server-push-based communications connection" refers to a network connection over which a request for transmission of information is initiated by a server or publisher. In embodiments, a "server-push-based communications connection" may be based on information preferences expressed in advance by the client device to the server. In embodiments, a server-push-based communications connection may also be based on information associated with a user identifier associated with the client device. In embodiments, a client device subscribes to events associated with particular object identifiers such that whenever updated object data is available for the particular object identifier (i.e., an event has occurred), the server pushes the updated object data to the client device.

The term "client-pull-based communications connection" refers to a network connection over which a request for transmission of information is initiated by a client device or requester and responded to by a server or publisher.

The term "real-time" is used to describe a computing application that responds as rapidly as required by a user accessing the computing application. For example, real-time messaging may comprise group-based communication interfaces that provide a real-time or live transmission of messages from a sending client device to a receiving client device. It will be appreciated that "real-time" may be considered "without undue delay," or "as instantaneously as possible" within computing constraints.

The term "user interaction input" refers to input received by a client device as a result of user interaction with input devices communicably coupled to the client device. For example, user interaction input may comprise mouse-clicks and/or touch screen selections.

The term "electronic interactions" refers to electronic representations of user interaction inputs. For example, a user interaction in the form of a mouse-click may be represented by a timestamp, an object identifier, and an interaction type (e.g., selection/click).

The term "tail data payload" refers to a plurality of data records associated with an object identifier, and associated with timestamps prior to a timestamp associated with a polling request for the tail data payload. For example, a tail data payload may represent a defined number (e.g., N, 20, etc.) of "recent" object events (e.g., messages, reactions, edits, deletions) associated with an object identifier (e.g., a group-based communication channel identifier).

The term "interruption" refers to a failure of a network/communication connection.

The term "polling request" refers to a message transmitted from a client device to a group-based communication server, the request being for retrieval of data by the client device from the group-based communication server. In examples, a polling request comprises an object identifier, a client device identifier, and a timestamp.

The term "tail data payload subset" refers to a subset of data contained in a tail data payload.

The term "updated content identifier" refers to a digital representation of an instance of updated content. For example, an updated content identifier may be a timestamp, a monotonically incremented revision number, and an identifier derived from one of content or a content hash. It will be appreciated that the updated content identifier provides indication to a client device that a change to content has occurred.

The term "timestamp" refers to a digital representation of an instance in network time associated with a particular occurrence, such as a polling request or message transmission. For example, a timestamp can be the following: "<timestamp>2020-12-31 23:59:59</timestamp>". In embodiments, a timestamp is in relation to a wall clock (e.g., 2020-12-31). In embodiments, a timestamp is a monotonically increasing identifier (e.g., one or more items of data by which an instance may be uniquely identified) that supports comparison of changes (i.e., older or newer changes). In embodiments, a timestamp is a content addressed identifier (e.g., one or more items of data by which a change in content may be uniquely identified) that represents that an instance or occurrence of content is different from a previous instance or occurrence.

It will be appreciated that a timestamp in relation to a wall clock and a timestamp that is a monotonically increasing identifier provide a client device with an indication that data has been updated over time. It will further be appreciated that the timestamp as a content addressed identifier provides a client device with an indication that data is different over time. It will be appreciated that one or a combination of all the above described timestamp examples can be used in embodiments of the present disclosure at any given time or in any given module.

The term "polling request timestamp" refers to a timestamp associated with when a particular polling request was transmitted by a client device or received by a group-based communication server.

The term "record" refers to a data structure containing object data associated with a particular object identifier. In embodiments, the object data is associated with a timestamp. In embodiments, the record is associated with a timestamp.

The term "mouse-click" refers to an input received by a client device from a hand-held pointing device communicably coupled thereto. In embodiments, a mouse-click indicates an electronic selection of one of a plurality of displayed objects in a group-based communication interface. In embodiments, a mouse-click is associated with one or more object identifiers.

The term "touch screen selection" refers to an input received by a client device from an input device (e.g., screen) layered on top of an electronic visual display of the client device. In embodiments, a touch screen selection indicates a "touch" of the screen where an object of the group-based communication interface is displayed. In embodiments, a touch screen selection is associated with one or more object identifiers.

The term "web API" refers to a set of defined interfaces through which interactions occur between a group-based communication platform and client or other devices accessing the group-based communication platform. In examples, a web API is a set of specifications, such as Hypertext Transfer Protocol (HTTP) request messages, and a set of response messages in, for example, JavaScript Object Notation (JSON) format.

The term "HTTP request" refers to an HTTP message transmitted from a client device to a group-based communication server, the request being for retrieval of data by the client device from the group-based communication server. In embodiments, the HTTP request may be a GET or POST request.

In certain embodiments, one or more of the interface computing entities and/or the message distribution servers may be geographically distributed, for example, to service client devices located geographically proximate the one or more computing entities. However, in certain embodiments the various computing entities (including the interface computing entities and/or the message distribution servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates example computing systems within which embodiments of the present invention may operate. Users may access a group-based communication platform 105 via a communication network 104 using client devices 101A-101N.

Communication network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 104 may include a cellular telephone, an 802.11, 802.16, 802.20, and/or WiMax network. Further, the communication network 104 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of group-based communication repositories 107 and plurality of group-based communication servers 106_1-106N accessible via the communication network 103. Collectively, the group-based communication servers 106_1-106N are configured for receiving messages transmitted from one or more client devices 101A-101N, generating and/or receiving messages indicative of object updates (if applicable), for transmitting messages to appropriate client devices 101A-101N.

The client devices 101A-101N may be any computing device as defined above. Electronic message data exchanged between the group-based communication servers 106_1-106N and the client devices 101A-101N may be provided in various forms and via various methods.

In some preferred and non-limiting embodiments, one or more of the client devices 101A-101N are mobile devices, such as smartphones or tablets. The one or more client devices may execute an "app" or other executable local processing instance to interact with the group-based communication servers 106_1-106N. Such apps are typically designed to execute on mobile devices, such as smartphones or tablets. For example, an app may be provided that executes on mobile device operating systems such as iOS®, Android®, or Windows®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more web-sockets or other communication connection.

In some preferred and non-limiting embodiments, the client devices 101A-101N may interact with the group-based communication servers 106_1-106N via a web browser. The client devices 101A-101N may also include various hardware or firmware designed to interact with the group-based communication servers 106_1-106N. Again, via the browser of the client devices 101A-101N, the client devices 101A-101N are configured for communicating with the group-based communication platform 105 via one or more websockets or other communication connection.

In some embodiments of an exemplary group-based communication platform 105, a message or messaging communication may be sent from a client device 101A-101N to a group-based communication platform 105. In various implementations, messages may be sent to the group-based communication platform 105 over communication network 104 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
```

-continued

```
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client IP>10.0.0.123</client IP>
        <user agent string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53 </user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed _flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.3 0</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14      (KHTML,     like    Gecko)     Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identified
        <channel_identifier>ID_channel_1</channel_identifier>
        <contents>That is an interesting invention. I have attached a copy our
patent policy.</contents>
        <attachments>patent_policy.pdf</attachments>
    </message>
</auth_request>
```

In the illustrated embodiment, the group-based communication platform 105 comprises a plurality of group-based communication servers 106_1-106N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, an object identifier as defined above may be associated with the message to indicate that a particular message is embodied as an object update relating to a particular object.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message, and these files may be separately identified as objects having a corresponding object identifier in certain embodiments. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the group-based communication servers 106_1-106N). Metadata associated with the message may be determined and the message may be indexed in the group-based communication servers 106_1-106N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the group-based communication servers 106_1-106N to facilitate searching. In one embodiment, the files may be indexed such that a company's or a group's files are indexed at a separate distributed repository.

Examples of electronic information exchange among one or more client devices 101A-101N and the group-based communication platform 105 are described below with reference to FIG. 1.

As shown in FIG. 1, the group-based communication platform 105 enables individual client devices 101A-101N to exchange various messages with one another and/or to retrieve object updates disseminated from the group-based communication platform 105. To exchange such messages, individual client devices 101A-101N transmit messages (e.g., text-based messages, files, video and/or audio streams, and/or the like) via a communication protocol (e.g., via a websocket, a non-RTM (non-Real Time Messaging) messaging protocol, and/or the like). Those messages are ultimately provided to one or more group-based communication servers 106_1-106N, which indexes the messages and distributes those messages to the intended recipients (e.g., client devices 101A-101N) of the message. Object updates are similarly provided to the group-based communication servers 106_1-106N, however such object updates may not originate from client devices 101A-101N. Instead, object updates may be provided from one or more external systems (e.g., file management systems) or the object updates may be generated by one or more computing entities within the group-based communication platform 105. The distributed messages are provided to the recipient client devices 101A-101N via the group-based communication servers 106_1-106N, which maintain websocket connections with individual recipient client devices 101A-101N of the message.

According to the embodiment of FIG. 1, the client devices 101A-101N are configured to display the received message in contextually-relevant user interfaces available to the user of the client device 101A-101N. For example, messages transmitted from a first client device 101 as a part of a group-based communication channel are displayed in a user interface display window on client devices 101A-101N associated with other members of the group-based communication channel. As discussed herein, messages indicative of particular object updates are transmitted with object identifiers usable by the recipient client devices 101A-101N to display those messages with appropriate context, such as appropriate user display elements and/or in association with applicable objects. Moreover, the object identifiers may be usable by various ones of the group-based communication servers 106_1-106N to filter messages destined for particular client devices 101A-101N based on object subscriptions as discussed herein.

To distribute messages to individual client devices 101A-101N, the messages are transmitted from the group-based communication servers 106_1-106N, which direct all messages destined for respective ones of the client devices 101A-101N, and transmits all of those messages to the client devices 101A-101N over appropriate connections (e.g., websocket connections, or non-RTM connections).

Example Apparatuses Utilized with Various Embodiments

Figure 2A:
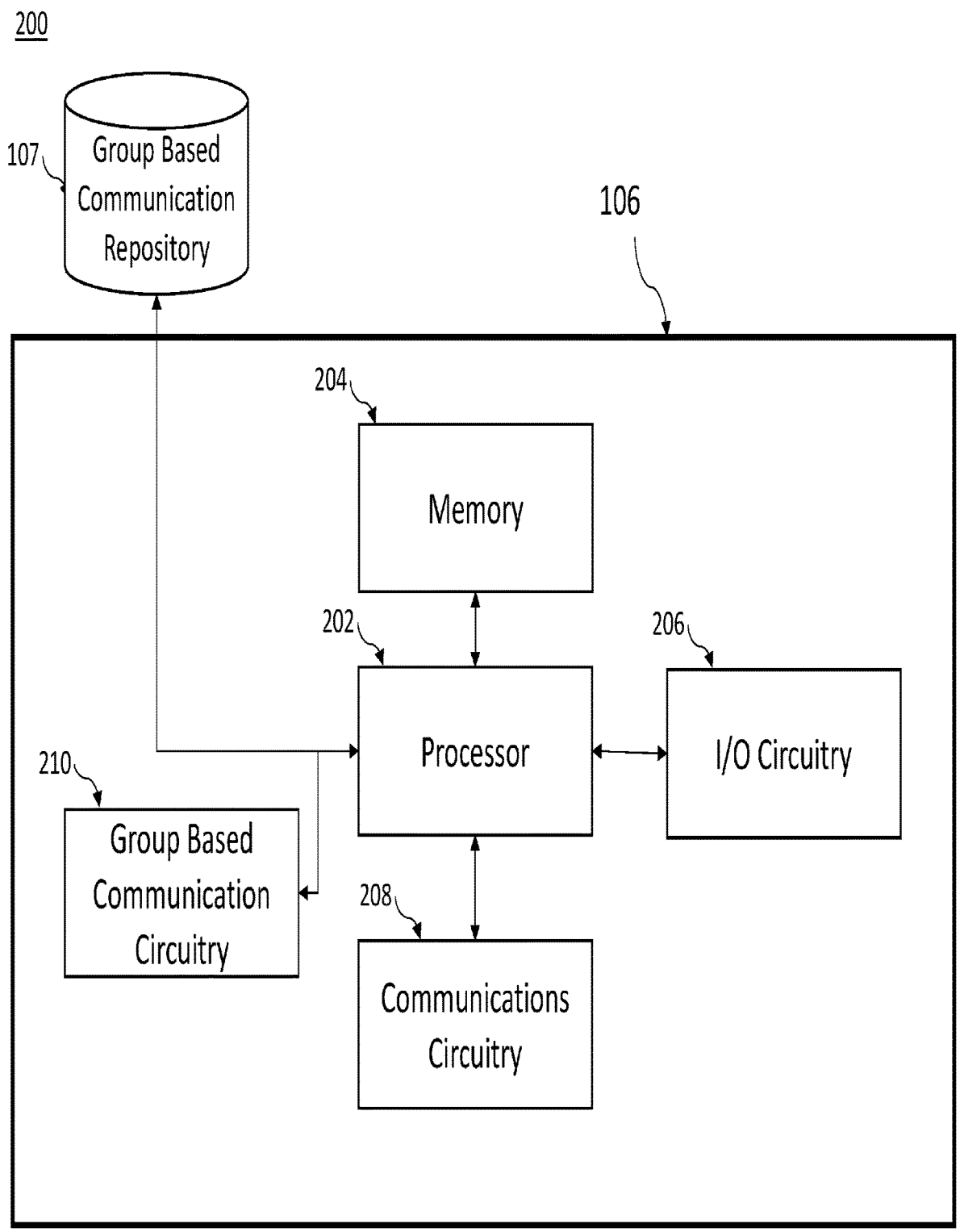
FIG. 2A shows a schematic view of an apparatus for use with embodiments of the present disclosure.

Each group-based communication server 106 may be embodied by one or more computing systems, such as apparatus 200 shown in FIG. 2A. The apparatus 200 may include processor 202, memory 204, input/output circuitry 206, communications circuitry 208, and group-based communication circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or coprocessor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-101N.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Group-based communication circuitry 210 includes hardware configured to receive and distribute electronic messages and associated metadata received from one or more client devices 101A-101N to other client devices 101A-101N based on database shard(s). The group-based communication circuitry 210 may utilize processing circuitry, such as the processor 202, to perform these actions. However, it should also be appreciated that, in some embodiments, the group-based communication circuitry 210 may include a separate processor, specially configured Field Programmable Gate Array (FPGA), or Application Specific Integrated Circuit (ASIC) for performing the functions described herein. The group-based communication circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 2B:
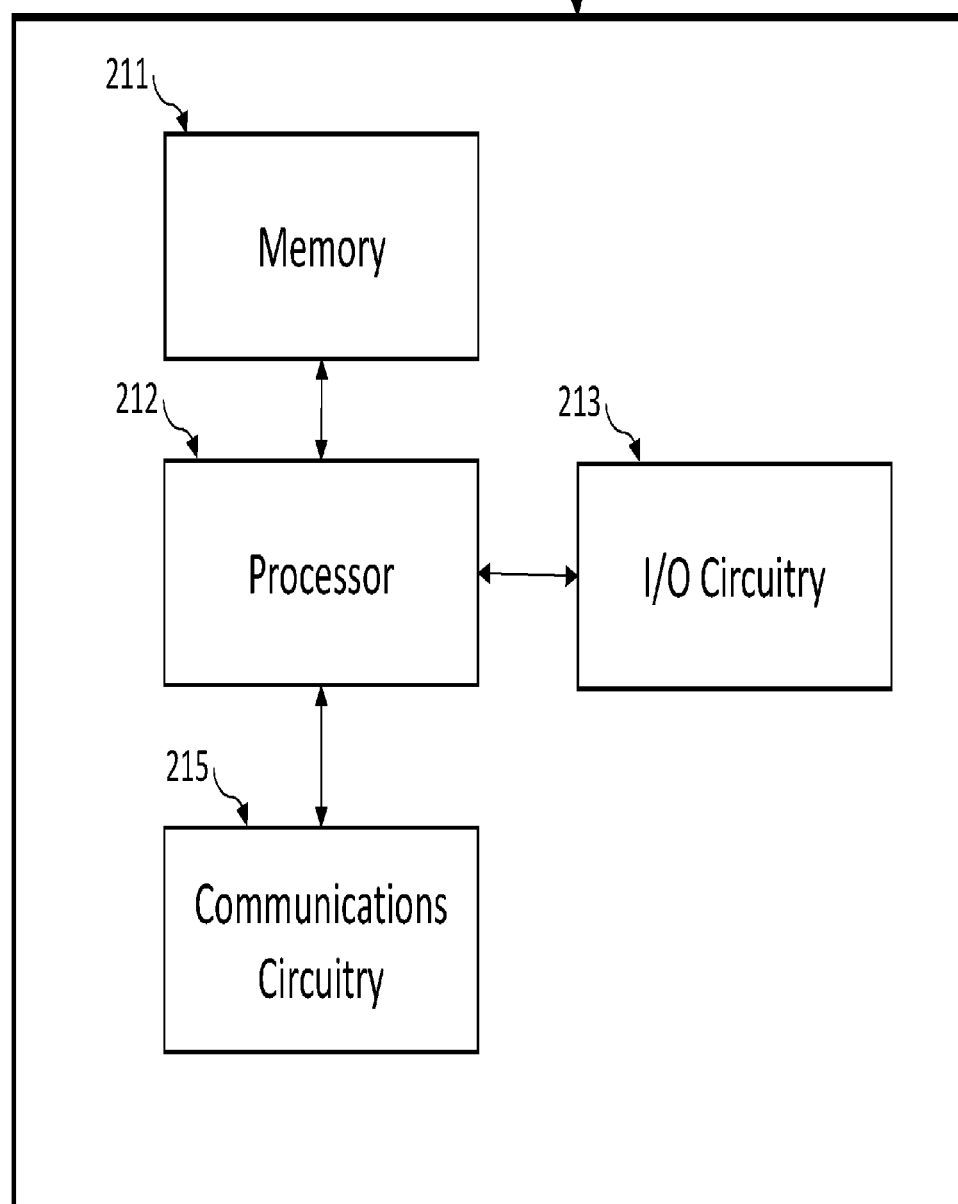
FIG. 2B shows a schematic view of a client device for use with embodiments of the present disclosure.

In the illustrated embodiment of FIG. 2B, the client device 101 is embodied by one or more computing systems encompassing apparatus 220. The illustrated apparatus 220 includes processor 212, memory 211, input/output circuitry 213, and communications circuitry 215. The apparatus 220 may be configured to execute the operations described herein. Although these components 211, 212, 213, 215 are described with respect to functional limitations, it should be understood that the particular implementations necessarily include the use of particular hardware. It should also be understood that certain of these components 211, 212, 213, 215 may include similar or common hardware. For example, two sets of circuitries may both leverage use of the same processor, network interface, storage medium, or the like to perform their associated functions, such that duplicate hardware is not required for each set of circuitries.

In some embodiments, the processor 212 (and/or co-processor or any other processing circuitry assisting or otherwise associated with the processor) may be in communication with the memory 211 via a bus for passing information among components of the apparatus. The memory 211 is non-transitory and may include, for example, one or more volatile and/or non-volatile memories. In other words, for example, the memory 211 may be an electronic storage device (e.g., a computer-readable storage medium). The memory 211 may be configured to store information, data, content, applications, instructions, or the like for enabling the apparatus 220 to carry out various functions in accordance with example embodiments of the present invention. For example, the memory 211 may be configured to cache messages exchanged on one or more group-based communication channels, such that the processor 212 may provide various messages to client devices (e.g., on an as needed or as requested basis).

The processor 212 may be embodied in a number of different ways and may, for example, include one or more processing devices configured to perform independently. In some preferred and non-limiting embodiments, the processor 212 may include one or more processors configured in tandem via a bus to enable independent execution of instructions, pipelining, and/or multithreading.

In some preferred and non-limiting embodiments, the processor 212 may be configured to execute instructions stored in the memory 211 or otherwise accessible to the processor 212. In some preferred and non-limiting embodiments, the processor 212 may be configured to execute hard-coded functionalities. As such, whether configured by hardware or software methods, or by a combination thereof, the processor 212 may represent an entity (e.g., physically embodied in circuitry) capable of performing operations according to an embodiment of the present invention while configured accordingly. Alternatively, as another example, when the processor 212 is embodied as an executor of software instructions, the instructions may specifically configure the processor 212 to perform the algorithms and/or operations described herein when the instructions are executed.

In some embodiments, the apparatus 220 may include input/output circuitry 305 that may, in turn, be in communication with processor 212 to provide output to the user and, in some embodiments, to receive an indication of a user input. The input/output circuitry 213 may comprise a user interface and may include a display, and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms.

The communications circuitry 215 may be any means such as a device or circuitry embodied in either hardware or a combination of hardware and software that is configured to receive and/or transmit data from/to a network and/or any other device, circuitry, or module in communication with the apparatus 220. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communications circuitry 215 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 220. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, 220, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 220 may provide or supplement the functionality of particular circuitry. For example, the processor 212 may provide processing functionality, the memory 211 may provide storage functionality, the communications circuitry 215 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

Figure 3A:
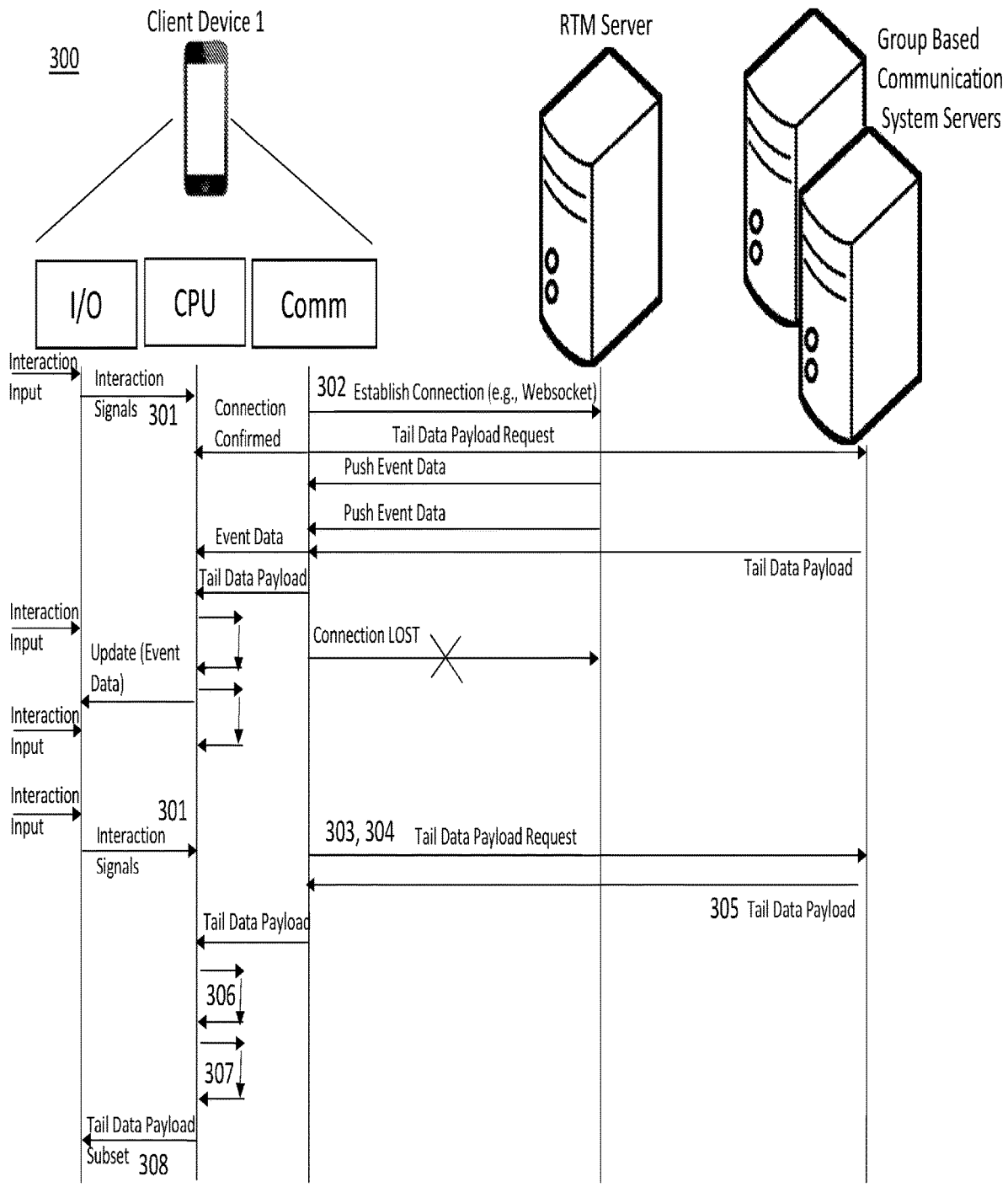
FIG. 3A shows a schematic view of data transmissions between a client device and a group-based communication platform or system, according to embodiments of the present disclosure.
Figure 3B:
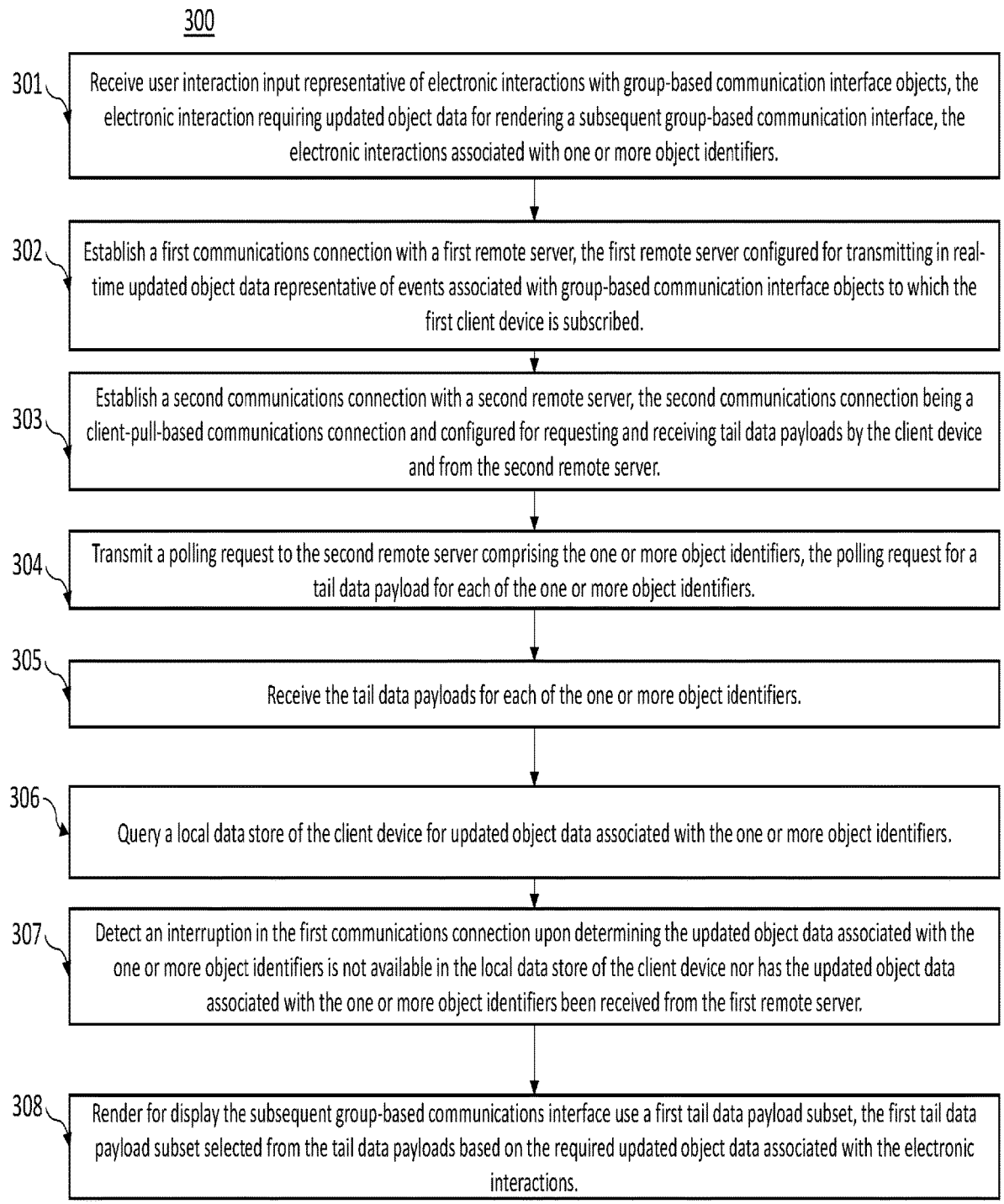
FIG. 3B is a flowchart illustrating the data transmissions between the client device and a group-based communication platform or system, according to embodiments of the present disclosure.

FIGS. 3A and 3B illustrate an exemplary data flow for providing or maintaining near real-time updated object data within a group-based communication system, according to embodiments of the present disclosure.

In embodiments, the client device receives user interaction input 301 representative of electronic interactions with group-based communication interface objects. In embodiments, the electronic interactions with the group-based communication interface objects require updated object data for rendering a subsequent group-based communications interface. In embodiments, the electronic interactions are associated with one or more object identifiers.

In embodiments, a client device (e.g., 101A-101N) establishes 302 a first communications connection (e.g., an active websocket connection) with a first remote server (e.g., a group-based communication server configured for real-time messaging communication). In embodiments, the first remote server is configured for transmitting in real-time updated object data representative of events associated with group-based communication interface objects to which the client device has subscribed. In embodiments, the updated object data is pushed from the first remote server to the client device.

In embodiments, the client device establishes 303 a second communications connection (e.g., non-RTM) with a second remote server (e.g., a group-based communication server not configured for real-time messaging communications). In embodiments, the second communications connection is a client-pull-based communications connection and is configured for requesting and receiving, by the client device, tail data payloads from the second remote server.

In embodiments, the client device transmits 304 a polling request to the second remote server, the polling request comprising the one or more object identifiers. In embodiments, the polling request is representative of a request (e.g., HTTP GET) for a tail data payload for each of the one or more object identifiers.

In embodiments, the client device receives 305 the requested tail data payloads.

In embodiments, the client device queries 306 a local data store of the client device for updated object data associated with the one or more object identifiers. In the event that updated object data associated with the one or more object identifiers is available in the local data store or has been received from the first remote server, the client device discards the tail data payload.

Upon determining that the updated object data is not available in the local data store and/or determining that the updated object data has not been received from the first remote server, the client device detects 307 an interruption in the first communication connection.

In embodiments, the client device then renders 308 for display the subsequent group-based communications interface using a tail data payload subset. In embodiments, the tail data payload subset is selected from the tail data payload based on the required updated object data associated with the electronic interactions. In so doing, the subsequent group-based communications interface provides a minimum level of service and data freshness during an outage or interruption of the first communications connection.

In embodiments, a second tail data payload subset of the tail data payload is utilized to render for display in the subsequent group-based communications interface a set of updated object data associated with updated content identifiers.

In embodiments, the tail data payload for each object identifier comprises an updated object data set having N records, each record having an updated content identifier indicating the record was created prior to a polling request timestamp associated with the polling request. In such embodiments, the tail data payload represents the N most recent updates to objects associated with the object identifier (e.g., the 50 most recent messages posted to a channel; the 10 most recent reactions to a message, and the like).

In embodiments, the first communications connection is an active websocket connection.

In embodiments, the one or more object identifiers are group-based communication channel identifiers.

In embodiments, an electronic interaction is a selection of a displayed group-based communication channel name. For example, an electronic interaction with an area of a group-based communication interface is associated with a group-based communication channel identifier. In such an example, the area may comprise a digital display of text representing the group-based communication channel name.

In embodiments, the selection of the displayed group-based communication channel name is received via one of a mouse-click or a touch screen selection.

In embodiments, the polling request is a transmission of a request message to a web Application Programming Interface (API).

In embodiments, the request message is a Hypertext Transfer Protocol (HTTP) request. In embodiments, the HTTP request may be a GET or POST request.

In embodiments, an updated content identifier comprises one or more of a timestamp, a monotonically incremented revision number, and an identifier derived from one of content or a content hash.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. One or more non-transitory computer-readable media storing computer-executable instructions that, when executed by at least one processor, perform a method of providing near real-time interface functionality to a group-based communication system when it is determined that a real-time messaging communication connection is interrupted, the method comprising:

establishing a first communications connection between a client device and a first remote server,
wherein the first remote server is configured for transmitting in real time updated object data for the group-based communication system;
establishing a second communications connection between the client device and a second remote server,
wherein the second remote server is configured for receiving client-pull-based requests from the client device and, in response, transmitting tail data payloads to the client device;
transmitting a polling request to the second remote server requesting a tail data payload for each of one or more object identifiers;
receiving, from the second remote server, the tail data payload for each of the one or more object identifiers; and
in response to detecting an interruption in the first communications connection, rendering a subsequent group-based communications interface on the client device using at least a portion of the tail data payloads.

2. The media of claim 1, wherein the computer-executable instructions are further executed to perform the steps of:
receiving user interaction inputs representative of electronic interactions with group-based communication interface objects; and
rendering the subsequent group-based communications interface based on the electronic interactions with the group-based communication interface objects and the updated object data.

3. The media of claim 1,
wherein the subsequent group-based communications interface is rendered for display using a first tail data payload subset selected from the tail data payload based on the updated object data, and
wherein a second tail data payload subset is utilized to render for display in the subsequent group-based communications interface a set of updated object data associated with updated content identifiers.

4. The media of claim 1,
wherein an object identifier of the one or more object identifiers is a group-based channel identifier, and
wherein the one or more object identifiers is transmitted as metadata associated with the updated object data.

5. The media of claim 1, wherein the client device is subscribed to events associated with the one or more object identifiers such that when an event occurs, the updated object data is pushed to the client device.

6. The media of claim 1, wherein the tail data payload for each of the one or more object identifiers comprises a record of a number of most recent object events associated with each of the one or more object identifiers.

7. The media of claim 1, wherein the polling request comprises the one or more object identifiers, a client device identifier, and a timestamp.

8. A method of providing near real-time interface functionality to a group-based communication system when it is determined that a real-time messaging communication connection is interrupted, the method comprising:

establishing a first communications connection between a client device and a first remote server,
wherein the first remote server is configured for transmitting in real time updated object data for the group-based communication system;
establishing a second communications connection between the client device and a second remote server,
wherein the second remote server is configured for receiving client-pull-based requests from the client device and, in response, transmitting tail data payloads to the client device;
transmitting a polling request to the second remote server requesting a tail data payload for each of one or more object identifiers;
receiving, from the second remote server, the tail data payload for each of the one or more object identifiers; and
in response to detecting an interruption in the first communications connection, rendering a subsequent group-based communications interface on the client device using at least a portion of the tail data payloads.

9. The method of claim 8, further comprising the steps of:
receiving user interaction inputs representative of electronic interactions with group-based communication interface objects; and
rendering the subsequent group-based communications interface based on the electronic interactions with the group-based communication interface objects and the updated object data.

10. The method of claim 8,
wherein the subsequent group-based communications interface is rendered for display using a first tail data payload subset selected from the tail data payload based on the updated object data, and
wherein a second tail data payload subset is utilized to render for display in the subsequent group-based communications interface a set of updated object data associated with updated content identifiers.

11. The method of claim 8,
wherein an object identifier of the one or more object identifiers is a group-based channel identifier, and
wherein the one or more object identifiers is transmitted as metadata associated with the updated object data.

12. The method of claim 8, wherein the client device is subscribed to events associated with the one or more object identifiers such that when an event occurs the updated object data is pushed to the client device.

13. The method of claim 8, wherein the tail data payload for each of the one or more object identifiers comprises a record of a number of most recent object events associated with each of the one or more object identifiers.

14. The method of claim 8, wherein the polling request comprises the one or more object identifiers, a client device identifier, and a timestamp.

15. A system for providing near real-time interface functionality to a group-based communication system when it is determined that a real-time messaging communication connection is interrupted, the system comprising:

a first communications connection between a client device and a first remote server,
wherein the first remote server is configured for transmitting in real time updated object data for the group-based communication system; and
a second communications connection between the client device and a second remote server,
wherein the second remote server is configured for receiving client-pull-based requests from the client device and, in response, transmitting tail data payloads to the client device,
wherein a polling request is transmitted to the second remote server requesting a tail data payload for each of one or more object identifiers, wherein the tail data payload for each of the one or more object identifiers is received at the client device from the second server, and wherein a subsequent group-based communications interface is rendered on the client device using at least portion of the tail data payloads.

16. The system of claim 15, wherein interaction inputs are received via the client device, wherein the interaction inputs are representative of electronic interactions with group-based communication interface objects, and wherein the subsequent group-based communications interface is rendered based on the electronic interactions with the group-based communication interface objects and the updated object data.

17. The system of claim 15, wherein the subsequent group-based communications interface is rendered for display using a first tail data payload subset selected from the tail data payload based on the updated object data, and wherein a second tail data payload subset is utilized to render for display in the subsequent group-based communications interface a set of updated object data associated with updated content identifiers.

18. The system of claim 15, wherein an object identifier of the one or more object identifiers is a group-based channel identifier, wherein the one or more object identifiers is transmitted as metadata associated with the updated object data, and wherein the client device is subscribed to events associated with the one or more object identifiers such that when an event occurs the updated object data is pushed to the client device.

19. The system of claim 15, wherein the tail data payload for each of the one or more object identifiers comprises a record of a number of most recent object events associated with each of the one or more object identifiers.

20. The system of claim 15, wherein the polling request comprises the one or more object identifiers, a client device identifier, and a timestamp.

* * * * *